May 15, 1951  H. N. SIMPSON  2,552,743
CONVEYER
Filed Dec. 4, 1947
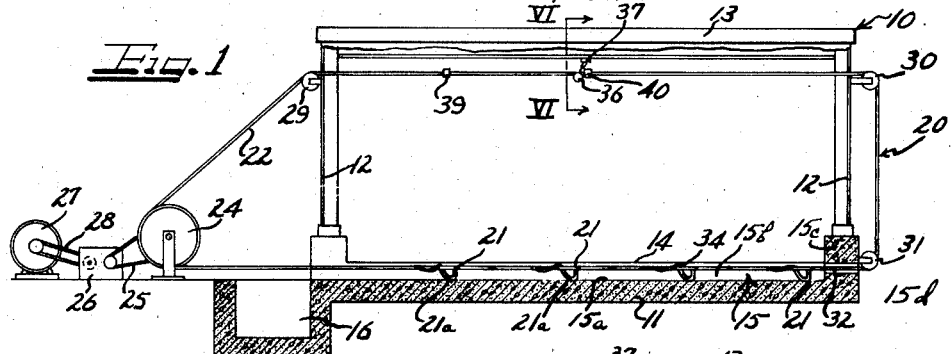
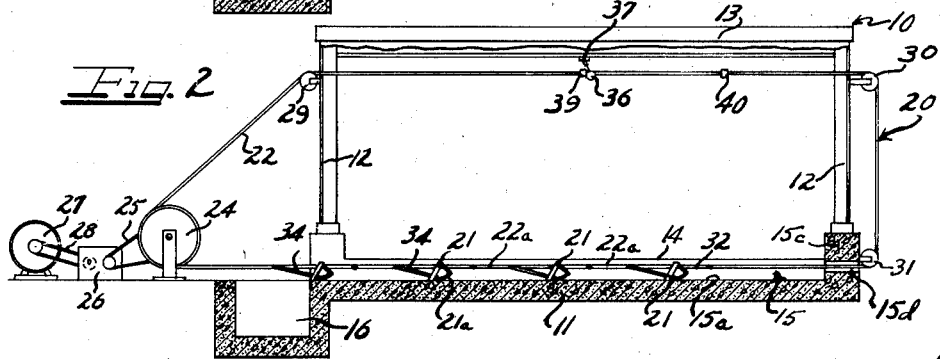
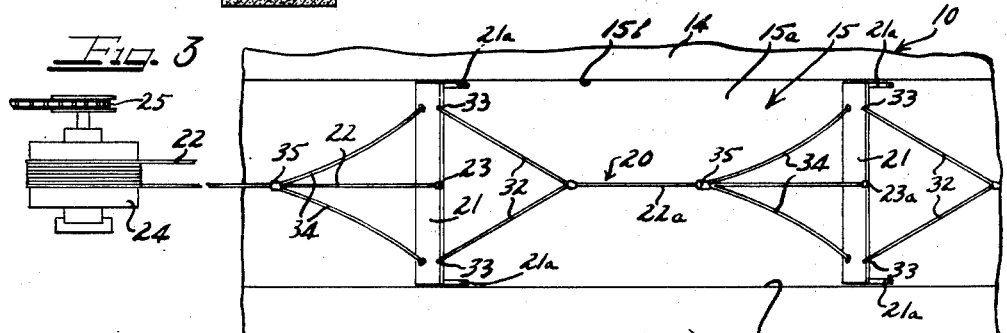
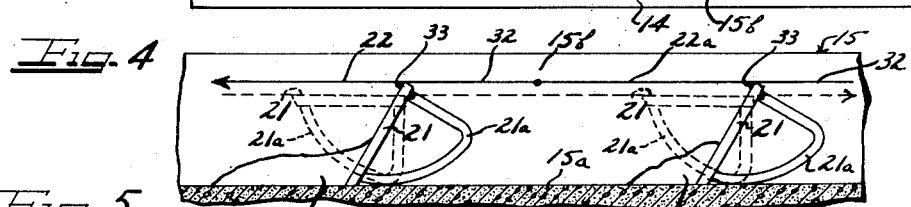
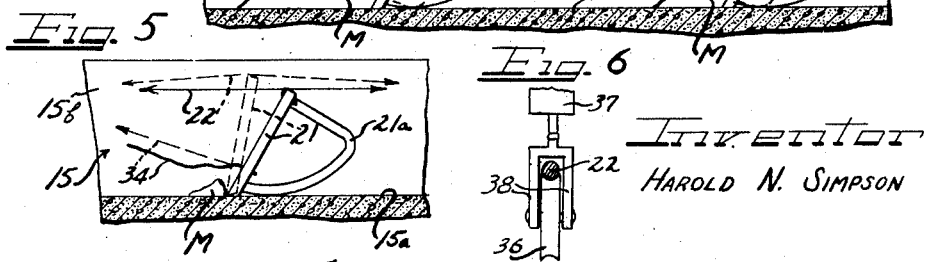
Inventor
HAROLD N. SIMPSON Patented May 15, 1951

2,552,743

UNITED STATES PATENT OFFICE 2,552,743

CONVEYER

Harold N. Simpson, Oak Park, Ill.

Application December 4, 1947, Serial No. 789,612

9 Claims. (Cl. 198—218)

This invention relates to conveyors having a series of flights arranged in tandem and operated on a reciprocating cycle to advance material in one direction.

Specifically, the invention deals with a conveyor device for conveying wet masses which may clog and foul other types of conveyors.

The invention will hereinafter be specifically described as embodied in a scraper-type conveyor for cleaning a barn, but it should be understood that the invention is not limited to such usage, being generally applicable to devices for moving material and especially useful to proportion feeding of materials to a mixer or the like.

According to the invention a plurality of scraper blades are hitched in tandem relation in a trough or other operating channel. These blades preferably have runners or end flanges for guiding the blades. The hitches are so arranged that an actuating cable aids in holding the scraping edges of the blades against the bottom of the trough with the blades extending transversely across the trough. Idler traces are provided to prevent tilting of the scraper blades beyond inclined tilting positions during the load-advancing movement or forward stroke of the blades. However, the blades are free to tilt or roll on their runners to raised positions during their return movement for riding over the advanced material without moving it backward. The cycle of reciprocation of the blades is proportioned so that the forward movement of each blade will cause advancement of material to a point where it is picked up by an adjacent forward blade at the rear end of the stroke of this blade. Therefore, as the blades are reciprocated, they advance piles of material along the bottom of the trough for a distance determined by the length of the forward stroke in the reciprocating cycle. On the rearward stroke of the cycle the blades tilt to ride freely over the material advanced by the succeeding blade for engaging this material on the next forward stroke. The material is thus moved forwardly in steps, the lengths of which are determined by the forward stroke of the reciprocating cycle.

When the conveyor is used as a barn cleaner, a pit is preferably provided at one end of the trough or channel for receiving the material discharged out of the end of the trough. In such use of the invention, the trough is preferably arranged so that the animal pens or stalls are easily flushed or washed down to discharge into the trough. Thus the pens or stalls are preferably located along the length of the trough on one or both sides thereof.

It is, then, an object of this invention to provide a conveyor which advances material in one direction by means of reciprocating units arranged in tandem.

Another object of the invention is to provide a reciprocating type of conveyor wherein the conveying devices are hitched together in tandem relation in such a manner that they will ride freely over the material in one direction but will engage and advance the material in the other direction.

A further object of the invention is to provide a conveyor which operates on a reciprocating stroke cycle and has actuating flights held, during the forward scraping stroke, against rearward tilting from predetermined forwardly inclined scraping positions but adapted to tilt or roll to non-scraping positions when pulled backward on the return stroke, whereby the flights will move material on the forward stroke but will ride over the material on the backward or return stroke.

A still further object of the invention is to provide a scraper-type conveyor for cleaning barns, for advancing proportioned amounts of material, and the like.

A specific object of the invention is to provide a reciprocating flight conveyor with blade-like flights having runners which will guide and support the blades in material-pushing positions during the forward stroke of the conveyor, but will hold the blades out of contact with the material during the return stroke of the conveyor.

Another specific object of the invention is to provide a hitch arrangement for tandem flights in a reciprocating-type conveyor which arrangement aids in holding the flights, during their forward stroke, in scraping relationship in a channel, and during the return stroke causes the flights to move to positions for riding over the material in the channel.

Other and further objects of the invention will be apparent to those skilled in the art from the following detailed description of the annexed sheet of drawings which, by way of a preferred example only, illustrates one embodiment of the invention.

On the drawings:

Figure 1 is a longitudinal cross-sectional view, with parts in side elevation, of a barn or pen equipped with a conveyor in accordance with this invention and showing the rolled over, runner-supported positions of the scraper-type conveyor flights at the end of their rearward or return stroke.

Figure 2 is a view similar to Figure 1 but showing the scraping positions of the conveyor flights at the end of their forward, or material-advancing, stroke.

Figure 3 is a broken fragmentary top plan view of the conveyor of Figures 1 and 2, illustrating the hitches used for connecting the flights in tandem relation.

Figure 4 is a fragmentary longitudinal cross-sectional view with parts in side elevation diagrammatically illustrating the positions of the flights during their forward and rearward strokes.

Figure 5 is a fragmentary view similar to Figure 4 but diagrammatically illustrating the manner in which a flight is held against rearward tilting by the idler traces in the hitches of this invention.

Figure 6 is a somewhat diagrammatic vertical cross-sectional view illustrating the trip switch and taken along the line VI—VI of Figure 1.

As shown on the drawings:

In Figures 1 to 3 inclusive, the reference numeral 10 designates generally an animal barn having a concrete base 11, side walls 12, and a roof or ceiling 13. The base 11 provides a floor 14 with a trough 15 extending along the full length of the barn. The trough 15 discharges through one end of the barn into a pit 16.

The trough 15 has a flat bottom wall 15a and vertical side walls 15b. It is closed at one end by a vertical back wall 15c and is open at the other end in direct communication with the top of the pit 16. The animal pens or stalls (not shown) are provided on the floor 14 on one or both sides of the trough 15 in side by side relation along the length of the trough to discharge directly over the side walls 15b into the bottom of the trough.

The conveyor 20 of this invention includes a plurality of scraper blade-type flights 21 in spaced tandem relation along the length of the trough 15. Each blade has runners or rockers 21a extending rearwardly from the ends of the blade to provide guides for the blade. The runners can be in the form of rods secured to the blade, turned-back ears or end flanges on the blade, metal bands secured to the blade, or the like. The runners have arcuate portions extending rearwardly from the bottom edge of the blade to afford a rocking support for guiding the blade between upright scraping position and a horizontal position above the bottom of the trough.

The blades extend transversely across the width of the trough into close-running clearance relationship with the side walls 15b thereof. The runners 21a are adjacent these side walls 15b to coact therewith for resisting cocking of the blade in the trough.

The blades are hitched together by means of cables. Thus the front end or forward blade 21 adjacent the pit end of the trough has a main cable 22 anchored to the top portion thereof midway between the ends of the blade as at 23. This main cable 22 extends forwardly over the top of the pit 16 and is anchored to and wound around a driving sheave 24 for a sufficient number of turns to accommodate the full stroke of the conveyor. The sheave 24 is driven through a sprocket and chain 25 from a gear reduction box 26. The box 26 is actuated by a reversible motor 27 through a belt drive 28. The cable 22 extends from the sheave 24 to an overhead guide pulley 29 mounted on the barn just below the roof or ceiling 13 at the end of the barn adjacent the sheave 24. A second pulley 30 is mounted on the other end of the barn, to receive the cable thereover. A run of the cable 22 is thereby maintained immediately below the ceiling 13.

A third pulley 31 is provided beneath the pulley 30 at a level for coacting with the sheave 24 to maintain a lower run for holding the blades 21 against the bottom 15a of the trough. The rear end of the cable 22 is then connected to the rear blade 21 by means of a pair of diverging trace cables 32. A passage 15d is provided in the rear wall 15c of the trough to accommodate the run of the cable 22 and the traces 32 between the pulley 31 and the rear blade 21. The traces 32 extend over the top edge of the blade as shown in Figure 3 and then are threaded rearwardly through holes in the blade which are spaced below the top edge. Knots or clamps on the ends of the traces prevent the traces from pulling through the holes. This arrangement provides runs of the traces around the top edge and over the front face of the blade which are effective to initiate rearward rocking of the blade on its runners to position the blade horizontally. As also shown in Figure 3, the traces are anchored adjacent the outer ends of the blade as at 33 and are of equal length to hold the blade against cocking in the trough.

Connecting cables 22a are provided for joining the blades 21 in tandem relation. Each connecting cable 22a is anchored at its rear end to the upper portion of the blade 21 at the midpoint of the blade as at 23a and at its forward end is connected to diverging traces 32 which in turn are anchored to the upper portion of the next forward blade as at 33. Thus a continuous cable loop is provided having an upper run immediately under the ceiling 13 and a lower run in the longitudinal center of the trough 15. The lower run of the cable loop is at a level for holding the scraper blades against the bottom 15a of the trough. Each blade is pulled from its midpoint and in turn pulls the next succeeding blade from adjacent its outer edges. This arrangement stabilizes the blades transversely across the width of the trough.

Idler traces 34, also composed of the same cable material as the cable 22, connect the lower portion of each blade 21 at the outer ends of the blade with the cable 22 or its sections 22a at points forwardly of the blade as at 35. These idler traces in normal operation of the conveyor on the forward stroke thereof are taut, but do not carry the main load. On the return stroke, the traces are slack. When the blades strike obstructions on the bottom of the trough 15a tending to tilt the blades rearwardly, the idler traces carry more of the load and are effective to resist tilting beyond a desired inclined scraping position of the blade where the pull of the cable holds the blade against the material being scraped.

The upper run of the cable 22, as best shown in Figures 1, 2, and 6, passes over an idler pulley 36 suspended from a trip switch 37 on a pair of legs 38 which straddle the cable 22. The trip switch 37 controls energization of the motor 27 and, when the pulley 36 tilts a switch element in one direction, the motor will rotate clockwise. When the pulley 36 tilts the switch element in the other direction, the motor will rotate counterclockwise. Tilting of the pulley 36 is caused by abutments or lugs 39 and 40 on the upper run of the cable on opposite sides of the pulley. Thus, as shown in Figure 1, when the lug 40 strikes the pulley 36, the switch 37 will be energized to reverse the motor 27 and initiate movement of the lug 39 toward the pulley 36. As shown in Figure 2, when the lug 39 strikes the pulley 36, the switch element is tilted in the opposite direction and the motor will again be reversed to repeat the cycle. As a result of these motor reversals, the lower run of the cable is reciprocated to first rock the blades 21 on their runners into scraping positions and then move the blades in upright scraping positions forwardly from the locations shown in Figure 1 to the locations shown in Figure 2 and to then rock the blades into horizontal positions and move them rearwardly back to the locations shown in Figure 1. It will be clear that material is advanced toward the pit 16 along the trough 15 by forward movement of the blades. The length of this forward stroke is easily controlled by the setting of the lug 39 on the upper run of the cable, since the forward stroke will continue until this lug engages the pulley 36 to reverse the stroke. The reversing stroke returns the blades to their starting positions and the blades are spaced apart a distance less than the length of the operating stroke so that material advanced by a trailing blade will be picked up by a preceding blade on the next stroke. In this manner, the material advances in increments along the bottom of the trough until it is eventually scraped out of the end of the trough into the pit 16.

As illustrated in Figures 4 and 5, the weight of the lower run of the cable aids in holding the blades against the bottom of the trough so that their runners 21a will ride in the trough to effectively support the blades in the upright inclined scraping position shown in solid lines in Figure 4, as well as in the rolled-over horizontal position shown in dotted lines. When the upright blades are pulled to the left (forwardly) they will scrape up piles of material M to clean the trough 15 and these piles are then pushed forwardly along the bottom of the trough. As shown in dotted lines, when the bottom run of the cable 22 is moved to the right (rearwardly) on the reverse stroke of the operating cycle, the blades 21 will be rocked on their runners to horizontal positions for riding over the piles of material M. This rocking action is initiated by threading the traces 32 over the upper edges of the blade as described above while leaving the bottom portion of the blade free to swing forwardly from its scraping position. The blades therefore will not return the material back to its starting position during the return stroke of the operating cycle.

As illustrated in Figure 5, when the blade 21 tends to assume an upright position, it must lift the lower run of the cable upwardly to the position shown in dotted lines and, of course, this action is resisted by the weight of the cable. Rearward tilting of the blade beyond an upright position, such as shown in dotted lines in Figure 5, is effectively stopped by the idler traces 34 which will become taut as shown in dotted lines whenever the bottom edge of the blade moves rearwardly. These idler traces 34 are therefore effective to prevent tilting of the blades in a rearward direction during the advancing stroke of the operating cycle, even though the scraping edges of the blades should meet an obstacle in the form of material M shown in Figure 5 which might be stuck to the trough 15.

From the above descriptions it should be clear that this invention provides a reciprocating type flight conveyor. The flights are preferably equipped with runners to rockably support the flights for movement between upright scraping or pushing positions and flat non-pushing positions. These positions are automatically assumed by the flights and are initiated by a reversal of stroke of the conveyor.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a conveyor including a floor structure having a trough along the length thereof and a discharge pit at one end of the trough, the improvement of a looped cable run having a lower run extending longitudinally of said trough, means for reciprocating said cable run through an operating cycle composed of equal fore and aft strokes of a predetermined length, and scrapers interposed in said lower run in spaced tandem relation in said trough, runners on the ends of said scrapers projecting rearwardly therefrom to hold the scrapers in upright scraping position on the fore stroke of the cable run and in horizontal non-scraping position on the aft stroke of the cable run, and said scrapers being positioned closer together than the lengths of said strokes of the operating cycle, to advance material along the trough toward the pit on the fore stroke and to ride over the material on the aft stroke for engaging the material from the trailing blades on the succeeding fore stroke.

2. In combination with a barn having a floor structure with a channel extending longitudinally thereof at a level beneath the floor structure, said channel being bounded at its sides by vertical walls and along its bottom by a horizontal wall, a pit at one end of said channel therewith, pulleys at the end of the barn, a cable run trained around said pulleys and having a bottom run in said channel and a superimposed top run, a pair of spaced abutment means on said top run, a switch between said abutment means, flights hitched to said bottom run of the cable in spaced tandem relation in said channel for reciprocation therein, and a reversible electric motor controlled by said switch for driving said cable, said abutment means on said upper run of the cable being effective to reversely throw said switch for reversing said motor thereby to control the stroke of reciprocation of said flights.

3. A cable-actuated flight conveyor comprising a series of blades, a trough receiving said blades, runners rockably supporting the blades in the trough, and cable means having hitch connections to said blades for rocking the blades into upright positions in said trough when the cable means pulls the blades along the trough in one direction and for rocking the blade into flat positions in the trough when the cable means pulls the blades in the reverse direction.

4. A material handling apparatus comprising a longitudinally extending scraper conveyor having a plurality of scraper blades spaced apart along the length of said conveyor and extending transversely of said conveyor, said conveyor further including a tiltable support means for each of said scraper blades responsive to changes of direction of said scraper blades to tilt each of said scraper blades into a material clearing position when said conveyor is moved in one direction and to retain each of said scraper blades in material engaging scraping position when said conveyor is moved in an opposite direction.

5. A material handling apparatus comprising a longitudinally extending scraper conveyor having a plurality of scraper blades spaced apart along the length of said conveyor and extending transversely of said conveyor, said conveyor further including a tiltable support means for each of said scraper blades responsive to changes of direction of said scraper blades to tilt each of said scraper blades into a material clearing position when said conveyor is moved in one direction and to retain each of said scraper blades in material engaging scraping position when said conveyor is moved in an opposite direction, and a driving means for said conveyor to reciprocate said conveyor back and forth through a stroke of predetermined amplitude.

6. A material handling apparatus comprising a longitudinally extending scraper conveyor having a plurality of scraper blades spaced apart along the length of said conveyor and extending transversely of said conveyor, said conveyor further including a tiltable support means for each of said scraper blades responsive to changes of direction of said scraper blades to tilt each of said scraper blades into a material clearing position when said conveyor is moved in one direction and to retain each of said scraper blades in material engaging scraping position when said conveyor is moved in an opposite direction, and a driving means for said conveyor to reciprocate said conveyor back and forth through a stroke of predetermined amplitude, said driving means including adjustable control means to selectively vary the amplitude of said stroke.

7. A material handling apparatus comprising a trough, a plurality of scraper blades in said trough in spaced apart relation to one another, cable means interconnecting each of said scraper blades and a tiltable support means for each of said scraper blades responsive to changes of direction of said scraper blades to tilt each of said scraper blades into a material clearing position spaced above the bottom of said trough when said scraper blades are moved in one direction and to retain each of said scraper blades in scraping engagement with said trough when said scraper blades are moved in an opposite direction.

8. A material handling apparatus comprising a trough, a plurality of scraper blades in said trough in spaced apart relation to one another, cable means interconnecting each of said scraper blades and a tiltable support means for each of said scraper blades responsive to changes of direction of said scraper blades to tilt each of said scraper blades into a material clearing position spaced above the bottom of said trough when said scraper blades are moved in one direction and to retain each of said scraper blades in scraping engagement with said trough when said scraper blades are moved in an opposite direction, and a driving means connected to said cable means to reciprocate said scraper blades back and forth through a stroke of predetermined amplitude.

9. A material handling apparatus comprising a trough, a plurality of scraper blades in said trough in spaced apart relation to one another, cable means interconnecting each of said scraper blades and a tiltable support means for each of said scraper blades responsive to changes of direction of said scraper blades to tilt each of said scraper blades into a material clearing position spaced above the bottom of said trough when said scraper blades are moved in one direction and to retain each of said scraper blades in scraping engagement with said trough when said scraper blades are moved in an opposite direction, and a driving means connected to said cable means to reciprocate said scraper blades back and forth through a stroke of predetermined amplitude, said driving means including an adjustable control means to selectively vary the amplitude of said stroke.

HAROLD N. SIMPSON.

REFERENCES CITED

The following references are of record in the file of this patent:

UNITED STATES PATENTS

| Number | Name | Date |
|---|---|---|
| 463,353 | Hackett | Nov. 17, 1891 |
| 731,003 | Willson | June 16, 1903 |
| 1,030,835 | Smith | June 25, 1912 |
| 1,087,324 | Sauerman | Feb. 17, 1914 |
| 1,166,601 | Kendle | Jan. 4, 1916 |
| 1,192,127 | Shostrom | July 25, 1916 |
| 1,441,555 | Bobseine | Jan. 9, 1923 |
| 1,699,175 | Yarn | Jan. 15, 1929 |
| 2,303,649 | Livingston | Dec. 1, 1942 |
| 2,369,720 | Crane | Feb. 20, 1945 |
| 2,391,700 | Hapman | Dec. 25, 1945 |

FOREIGN PATENTS

| Number | Country | Date |
|---|---|---|
| 399,625 | Great Britain | Oct. 12, 1933 |